United States Patent
Yang et al.

(10) Patent No.: US 11,563,493 B2
(45) Date of Patent: Jan. 24, 2023

(54) REMOTE RADIO UNIT AND CENTRAL UNIT FOR MULTIPLE-INPUT MULTIPLE-OUTPUT SYSTEM

(71) Applicant: Huawei Technologies Co., Ltd., Shenzhen (CN)

(72) Inventors: Ganghua Yang, Shanghai (CN); Ramin Khayatzadeh, Munich (DE); Zhipeng Zhao, Shenzhen (CN); Hongqiang Bao, Boulogne Billancourt (FR)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/238,912

(22) Filed: Apr. 23, 2021

(65) Prior Publication Data
US 2021/0266070 A1    Aug. 26, 2021

Related U.S. Application Data

(63) Continuation of application No. PCT/EP2018/079432, filed on Oct. 26, 2018.

(51) Int. Cl.
*H04B 10/2575* (2013.01)
*H04B 10/50* (2013.01)
(Continued)

(52) U.S. Cl.
CPC ..... *H04B 10/25753* (2013.01); *H04B 10/503* (2013.01); *H04L 5/0053* (2013.01); *H04L 5/14* (2013.01); *H04L 27/20* (2013.01)

(58) Field of Classification Search
None
See application file for complete search history.

(56) References Cited

U.S. PATENT DOCUMENTS

| 5,331,453 A | 7/1994 | Lipsky |
| 2003/0201839 A1 | 10/2003 | Luo et al. |

(Continued)

FOREIGN PATENT DOCUMENTS

| CN | 102186264 A | 9/2011 |
| CN | 105450373 A | 3/2016 |

(Continued)

OTHER PUBLICATIONS

Atso Hekkala, "Architectures for Joint Compensation of RoF and PA with Nonideal Feedback," 2010 IEEE 71st Vehicular Technology Conference, 2010, pp. 1-5, doi: 10.1109/ETECS.2010.5493871. (Year: 2010).*

(Continued)

*Primary Examiner* — Darren E Wolf
(74) *Attorney, Agent, or Firm* — Slater Matsil, LLP

(57) ABSTRACT

A MIMO system comprises a remote radio unit (RRU) and central unit. The RRU comprises: a binary phase shift keying (BPSK) modulator, configured to modulate a BPSK waveform by a local oscillator (LO) signal to generate a stimulus signal, wherein the LO signal is derived from a downlink optical signal received via downlink radio over fiber (DL-ROF) from a central unit (CU); and an optical signal generator, in particular a laser, configured to generate an uplink optical signal based on the stimulus signal for transmission via uplink radio over fiber (UL-ROF) to the CU.

20 Claims, 12 Drawing Sheets

(51) Int. Cl.
*H04L 5/00* (2006.01)
*H04L 5/14* (2006.01)
*H04L 27/20* (2006.01)

(56) References Cited

U.S. PATENT DOCUMENTS

| | | |
|---|---|---|
| 2005/0157814 A1 | 7/2005 | Cova et al. |
| 2007/0171515 A1* | 7/2007 | Kang .................. H01S 5/50 359/344 |
| 2013/0337750 A1* | 12/2013 | Ko .................... H04W 24/00 455/67.13 |
| 2014/0050212 A1* | 2/2014 | Braz ..................... H04B 1/005 370/343 |
| 2014/0064730 A1* | 3/2014 | Ko .................. H04B 10/25754 398/43 |
| 2014/0072024 A1* | 3/2014 | Warke ............... H04L 27/0014 375/232 |
| 2014/0355991 A1* | 12/2014 | Cameirao .......... H04B 10/2575 398/79 |
| 2016/0094293 A1 | 3/2016 | Magnezi |
| 2017/0034716 A1* | 2/2017 | Dortschy ............. H04W 24/06 |
| 2021/0083772 A1 | 3/2021 | Bao et al. |

FOREIGN PATENT DOCUMENTS

| | | |
|---|---|---|
| EP | 2830382 A1 | 1/2015 |
| JP | S5586230 A | 6/1980 |
| JP | H11355209 A | 12/1999 |
| JP | 2010041269 A | 2/2010 |
| JP | 2016536948 A | 11/2016 |

OTHER PUBLICATIONS

Huang Q. et al., "Design and Study of 3G Intelligent Optical Transceiver Module for Fiber-optic Repeaters", Journal of WUT (Informational & Management Engineering), vol. 30, No. 3, Jun. 2008, 5 pages.

Hekkala, A. et al, "Architectures for Joint Compensation of RoF and PA with Nonideal Feedback", 2010 IEEE Vehicular Technology Conference, May 2010, 5 pages.

Bergmann, E. E. et al, "Dispersion-Induced Composite Second-Order Distortion at 1.5μm", IEEE Photonics Technology Letters, vol. 3, No. 1, Jan. 1991, 3 pages.

Hekkala, A. et al., "Predistortion of Radio Over Fiber Links: Algorithms, Implementation, and Measurements", IEEE Transactions on Circuits and Systems—I: Regular Papers, vol. 59, No. 3, Mar. 2012, pp. 664-672.

* cited by examiner

REMOTE RADIO UNIT AND CENTRAL UNIT FOR MULTIPLE-INPUT MULTIPLE-OUTPUT SYSTEM

CROSS-REFERENCE TO RELATED APPLICATIONS

This application is a continuation of International Application No. PCT/EP2018/079432, filed on Oct. 26, 2018, the disclosure of which is hereby incorporated by reference in its entirety.

TECHNICAL FIELD

The present disclosure relates to a Remote Radio Unit (RRU) and a Central Unit (CU) for Multiple-Input Multiple-Output systems, in particular massive MIMO systems. The disclosure further relates to methods for generating uplink (UL) and downlink (DL) signals for such MIMO systems.

BACKGROUND

Analogue Radio Over Fiber (ROF) exhibits great interest in RRU design especially in massive MIMO scenario for its advantage in volume, weight and power consumption as only optical-electrical (O-E) conversion and RF radio frequency (RF) amplification are required. In the meanwhile, the digital pre-distortion (DPD) is widely used to compensate RF front-end distortion, for example nonlinearity of the power amplifier. In the scope of analogue ROF, the uplink ROF is used as feedback channel for DPD algorithm, however, due to the distortion introduced by ROF feedback channel, DPD algorithm's performance is respectively degraded: especially, the non-linear distortion will greatly increase the adjacent channel leakage ratio (ACLR). In the following, ROF distortion is denoted by $\Phi_{ROF}(\cdot)$ as shown in FIG. 1 which illustrates ROF channel's distortion. In FIG. 1, signal $x_{RF}(t)$ 104 excites a directly modulated laser (DML) 101. Output signal of laser 101 passes single mode fiber (SMF) 102 after which post-distortion (PD) 103 provides signal $y_{RF}(t)$ 105.

The DPD degradation can be explained with help of FIG. 2, where s(t), 204 is the desired signal, x(t), 207 is the pre-distorted signal, y'(t), 206 is the feedback signal, y(t), 205 is the transmitted signal. $\Psi(\cdot)$ is used to denote the nonlinear system 202, such like power-amplifier, and $\Phi(\cdot)$ to denote the feedback channel 203, like ROF channel. As DPD training algorithm 201 targets y'(t)=s(t), the truly transmit signal y(t) 205 is close to $\Phi^{-1}(s)$, which is distorted version of s(t), 204.

The common solution is to mitigate the feedback channel's distortion. As discussed in "E. E. Bergamann, "Dispersion-Induced Composite Second-Order Distortion at 1.5 um," *IEEE PHOTONICS TECHNOLOGY LETTER* VOL 3 NO 1, 1991", the major distortion for the ROF is caused by the joint-work of fiber's chromatic dispersion and laser chirp effect. To avoid such degradation, a dispersion chromatic module (DCM) can be used and it has been proven effective in test. But this solution increases significantly the hardware cost. At current state-of-the-art, a digital method operating with baseband signal seems to be more attractive, namely the post-distortion as recommended in "A. Hekkala, M. Lasanen, L. C. Vieira, N. J. Gomes und A. Nkansah, "Architectures for joint compensation of RoF and PA with nonideal feedback," in *IEEE VTC Spring*, Taipei, Taiwan, May 2010".

The dispersion chromatic module (DCM) consists of using passive optic device that compensates the chromatic dispersion introduced in fiber transmission. It operates with optic signal and has proven effective for the non-linear behaviour of analogue ROF. However, this device is relatively expensive and in practice it must be adapted to specific fiber in use, for example 20 km 1550 m. Moreover, the use of DCM will introduce the attenuation of optic signal's strength that is definitely not wished in real network design.

At current state-of-the-art, a digital method operating with baseband signal seems to be more attractive, namely the post-distortion as recommended in "A. Hekkala, M. Lasanen, L. C. Vieira, N. J. Gomes und A. Nkansah, "Architectures for joint compensation of RoF and PA with nonideal feedback," in *IEEE VTC Spring*, Taipei, Taiwan, May 2010", see FIG. 3 illustrating training sequence based post-distortion at RRU side 300. This method is composed of: (1) RRU 300 sends a training signal that can approximate the statistical behaviour of the ROF input signal 314; (2) central unit performs nonlinear system identification by using the known training signal; (3) perform non-linear post-distortion 301 on the received signal 313 for both UL 323 and feedback 324 use. The disadvantages of such post-equalization method are, in order to send the training signal from RRU sides 300, it is required first the use of large memory to store the digital signal, then DAC 308 and RF signal modulation with respect to the feedback RF signal 324 center frequency requires additional hardware. Moreover, the LO fed to upconverter 309 needs to be perfectly synchronized with LO of down-converter at central unit side.

In order to simplify the RRU design 300, the input signal power can be reduced by taking into account that the non-linear distortion is proportional to the cubic of input signal's power such that at certain power level, the non-linear effect can be neglectable and the system $\Phi_{ROF}(\cdot)$ can be approximated by a linear system:

$$\begin{cases} h_{ROF} = \Phi_{ROF}(\cdot) \\ y_{RF}(t) = h_{ROF}(t)\hat{a}x_{RF}(t) \end{cases} \quad (1)$$

$x_{RF}(t)$ is at low–power level input signal

Although the SNR will be reduced accordingly, this setting is welcome when high linearity of system is required. The linearization requires that the feedback ROF channel contains neglectable linear distortion; however, this condition doesn't hold always true due to hardware impairment.

SUMMARY

It is the object of the invention to provide techniques for solving the above described problems, i.e. to reduce the hardware complexity and costs for implementing radio over fiber (ROF) systems, in particular ROF systems using digital predistortion (DPD) and feedback as shown in FIG. 2.

This object is achieved by the features of the independent claims. Further implementation forms are apparent from the dependent claims, the description and the figures.

A basic idea of the invention is to use a very compact radio remote unit (RRU) design by employing a simple stimulus signal generation with assumption that there is no knowledge of the stimulus sequence at the receiver side. In such scenario, blind equalization is performed and the following system design, namely BPSK-aided post-distortion, is applied with a carrier signal (LO) modulated by a binary sequence randomly generated at RRU side. The power of RF signal as input to uplink ROF (DML) is controlled by CU. Such a design is described below with respect to FIG. 4.

The disclosed RRU design can be characterized by the following features:

(1) the CU sends the LO signal with carrier frequency $f_c$ via the DL-ROF;

(2) RRU side receives this LO signal, then performs Band Pass Filter (BPF) to retrieve the LO signal before feeding it to Binary Phase Shift Keying (BPSK) modulator; on the other hand, a BPSK waveform generated by a random binary sequence generator (PRBS, pseudo-random binary sequence) or white noise generator is sent to BPSK-modulator; the modulated BPSK RF signal is sent to the UL-ROF (feedback channel) with gain g controlled by central unit (CU);

(3) at CU side, blind linear channel equalization is applied, for example decision-driven least mean squares (DD-LMS) algorithm, on the received baseband signal to identify the uplink linear distortion; by varying the gain g at RRU side, find the amplitude-to-amplitude modulation (AM-AM) function corresponding to the UL-ROF memoryless nonlinear distortion;

(4) at CU side linear distortion compensation and non-linear distortion compensation is applied on the DPD feedback signal or uplink signal.

In order to describe the invention in detail, the following terms, abbreviations and notations will be used:

| | |
|---|---|
| RRU: | Remote Radio Unit |
| CU: | Central Unit |
| MIMO: | Multiple Input Multiple Output |
| DPD: | digital pre-distortion |
| DML: | directly modulated laser |
| SMF: | Single Mode Fiber |
| PD: | Post-Distortion |
| ACLR: | adjacent channel leakage ratio |
| DCM: | dispersion chromatic module |
| DL: | downlink |
| UL: | uplink |
| DAC: | digital-to-analogue converter |
| ADC: | analogue-to-digital converter |
| BPSK: | binary phase shift keying |
| ROF: | Radio over Fiber |
| DD-LMS: | decision directed least mean squares |
| AM-AM: | amplitude-to-amplitude modulation |
| BPF: | band pass filter |
| PRBS: | pseudo-random binary sequence (generator) |
| LO: | local oscillator |
| RF: | radio frequency |
| PA: | power amplifier |
| ANT SW: | antenna switch |
| U/C: | up-converter |
| D/C: | down-converter |
| VGA: | variable gain amplifier |
| SIG GEN: | signal generator |
| BB: | broadband |
| MOD: | modulator |
| CFO | carrier-frequency offset |
| TDD: | time division duplex |

According to a first aspect, the invention relates to a remote radio unit (RRU) comprising: a binary phase shift keying (BPSK) modulator, configured to modulate a BPSK waveform by a local oscillator (LO) signal to generate a stimulus signal, wherein the LO signal is derived from a downlink optical signal received via downlink radio over fiber (DL-ROF) from a central unit (CU); and an optical signal generator, in particular a laser, configured to generate an uplink optical signal based on the stimulus signal for transmission via uplink radio over fiber, UL-ROF, to the CU.

Such a RRU design can be implemented at reduced hardware complexity and costs. The RRU design can implement radio over fiber (ROF) systems, in particular ROF systems using digital predistortion (DPD) and feedback.

Such a RRU can be implemented by a compact and low-cost RRU design, the same stimulus signal can be reused for multiple/massive MIMO case. The RRU design provides a high quality UL-ROF channel and a high quality feedback ROF channel for DPD application. At central unit side, simple equalization algorithms can be implemented. Besides, there are no-extra ROF link requirement for TDD system and on-line calibration for adaptive ROF deployment.

In an exemplary implementation form of the RRU, a power of the uplink optical signal is controlled by the CU via control channel.

This provides the advantage that non-linear distortions can be effectively controlled by the CU.

In an exemplary implementation form of the RRU, the RRU comprises a band pass filter, BPF, configured to retrieve the LO signal from the downlink optical signal.

This provides the advantage that the band pass filter can filter out harmonics of the received signal due to non-linear distortions of the channel.

In an exemplary implementation form of the RRU, the downlink optical signal carries the LO signal of carrier frequency fc and harmonics of the carrier frequency fc.

This provides the advantage that the downlink optical signal can be used as control signal for the BPSK modulator as it carries information about the carrier frequency fc from the CU. The transmission efficiency is improved, as less resources are used.

In an exemplary implementation form of the RRU, a pass band frequency range of the BPF includes the carrier frequency fc.

This provides the advantage that the band pass filter is adjusted to pass the carrier frequency fc from CU to the BPSK modulator.

In an exemplary implementation form of the RRU, the RRU comprises a pseudo-random binary sequence, PRBS, generator or a white noise generator configured to generate the BPSK waveform.

This provides the advantage that such a PRBS or white noise generator is easy to implement, e.g. by using a shift register design.

In an exemplary implementation form of the RRU, the RRU is operated in time division duplex (TDD) mode, a downlink (DL) phase of the TDD mode is used for reception of the DL optical signal via DL-ROF, an uplink (UL) phase of the TDD mode is used for transmission of the UL optical signal via UL-ROF, and a DL/UL or UL/DL switch interval is used for training and/or calibration.

This provides the advantage that the design is compact and efficient due to the different phases of the TDD mode in which the different tasks of the RRU can be realized.

According to a second aspect, the invention relates to a central unit (CU) comprising: an optical signal generator, in particular a laser, configured to generate a downlink optical signal based on a downlink digital signal for transmission via downlink radio over fiber (DL-ROF) to a radio remote unit (RRU); a digital pre-distorter (DPD) configured to digitally pre-distort the downlink digital signal based on a DPD feedback signal; and a blind linear digital channel equalizer, configured to provide the DPD feedback signal based on an uplink optical signal received via uplink radio over fiber (UL-ROF) from the RRU.

Such a CU can be implemented by a compact and low-cost CU design, the same stimulus signal can be reused for multiple/massive MIMO case. The CU design provides a high quality UL-ROF channel and a high quality feedback ROF channel for DPD application. Simple equalization algorithms can be implemented. Besides, there are no-extra ROF link requirement for TDD system and on-line calibration for adaptive ROF deployment.

In an exemplary implementation form of the CU, the CU is configured to apply a decision-directed least-mean-squares (DD-LMS) algorithm on an uplink digital signal derived from the uplink optical signal to determine equalization coefficients of the blind linear digital channel equalizer.

Such a CU can implement simple equalization algorithms such as the DD-LMS, reducing hardware (and/or software) complexity.

In an exemplary implementation form of the CU, the CU is configured to vary a gain of the uplink optical signal generated at the RRU via a control channel with the RRU to identify a non-linear distortion introduced by the UL-ROF.

This provides the advantage that non-linear distortion can be controlled and minimized.

In an exemplary implementation form of the CU, the CU is configured to identify an amplitude-to-amplitude modulation (AM-AM) response of the UL-ROF based on the gain variation of the uplink optical signal.

This provides the advantage that the AM-AM response can be controlled and optimized.

In an exemplary implementation form of the CU, the CU is configured to identify the non-linear distortion introduced by the UL-ROF based on an approximation as a memoryless non-linear system, in particular by an N-L or Hammerstein model.

This provides the advantage that an efficient model can be applied for describing the non-linear distortion and by that model optimizing the MIMO system.

In an exemplary implementation form of the CU, the CU is configured to adjust the blind linear digital channel equalizer based on the relation:

$$u_{BB} = h_{UL,CU} * \Phi_{UL,ROF}(gr_{BB}) + n_{BB},$$

where $u_{BB}$ denotes digital baseband representation of the uplink optical signal, $h_{UL,CU}$ denotes linear distortion introduced at the CU, $\Phi_{UL,ROF}$ denotes non-linear distortion introduced by the UL-ROF, g denotes gain of the uplink optical signal generated at the RRU, $r_{BB}$ denotes digital baseband representation of a BPSK waveform at the RRU used to generate the uplink optical signal and $n_{BB}$ denotes a distortion signal.

This provides the advantage that such adjustment of the blind equalization can be easily implemented and provides fast convergence and good tracking performance.

In an exemplary implementation form of the CU, the CU is operated in time division duplex (TDD) mode, a downlink (DL) phase of the TDD mode is used for transmission of the DL optical signal via DL-ROF, an uplink (UL) phase of the TDD mode is used for reception of the UL optical signal via UL-ROF, and a DL/UL or UL/DL switch interval is used for training and/or calibration.

This provides the advantage that the design is compact and efficient due to the different phases of the TDD mode in which the different tasks of the CU can be realized.

In an exemplary implementation form of the CU, the CU is configured to send a local oscillator, LO, signal of carrier frequency fc via the DL-ROF to the RRU.

This provides the advantage that the RRU has information about the carrier frequency at the CU and hence can optimally adjust the BPSK modulator.

According to a third aspect, the invention relates to a multiple-input multiple-output (MIMO) system, comprising: a central unit (CU) according to the second aspect described above; and a remote radio unit (RRU) according to the first aspect described above, coupled to the CU by a single mode fiber (SMF).

Such a MIMO system can be efficiently implemented by a compact and low-cost RRU and CU design, the same stimulus signal can be reused for multiple/massive MIMO case. The MIMO system provides a high quality UL-ROF channel and a high quality feedback ROF channel for DPD application. Simple equalization algorithms can be implemented. Besides, there are no-extra ROF link requirement for TDD system and on-line calibration for adaptive ROF deployment.

According to a fourth aspect, the invention relates to a method for generating an uplink optical signal by a remote radio unit (RRU), the method comprising: receiving a downlink optical signal received via downlink radio over fiber (DL-ROF) from a central unit (CU); generating a stimulus signal based on a binary phase shift keying (BPSK) modulation of a BPSK waveform by a local oscillator (LO) signal, wherein the LO signal is derived from the downlink optical signal; and generating, by an optical signal generator, in particular a laser, an uplink optical signal based on the stimulus signal for transmission via uplink radio over fiber (UL-ROF) to the CU.

Such a method can be easily implemented by a compact and low-cost RRU and CU design, the same stimulus signal can be reused for multiple/massive MIMO case. The method provides a high quality UL-ROF channel and a high quality feedback ROF channel for DPD application.

According to a fifth aspect, the invention relates to a method for generating a downlink optical signal by a central unit (CU), the method comprising: generating, by an optical signal generator, in particular a laser, a downlink optical signal based on a downlink digital signal for transmission via downlink radio over fiber (DL-ROF) to a radio remote unit (RRU); digitally pre-distorting, by a digital pre-distorter unit (DPD), the downlink digital signal based on a DPD feedback signal; and providing, by a blind linear digital channel equalizer, the DPD feedback signal based on an uplink optical signal received via uplink radio over fiber (UL-ROF) from the RRU.

Such a method can be easily implemented with a compact and low-cost CU and RRU design, the same stimulus signal can be reused for multiple/massive MIMO case. The method provides a high quality UL-ROF channel and a high quality feedback ROF channel for DPD application. Simple equalization algorithms can be implemented.

According to a sixth aspect, the invention relates to a computer program product including computer executable code or computer executable instructions that, when executed, causes at least one computer to execute the method according to the fourth or fifth aspect. Such a computer program product may include a non-transient readable storage medium storing program code thereon for use by a processor, the program code comprising instructions for performing the methods or the computing blocks as described hereinafter.

BRIEF DESCRIPTION OF THE DRAWINGS

Further embodiments of the invention will be described with respect to the following figures, in which.

DETAILED DESCRIPTION OF ILLUSTRATIVE EMBODIMENTS

Figure 1:
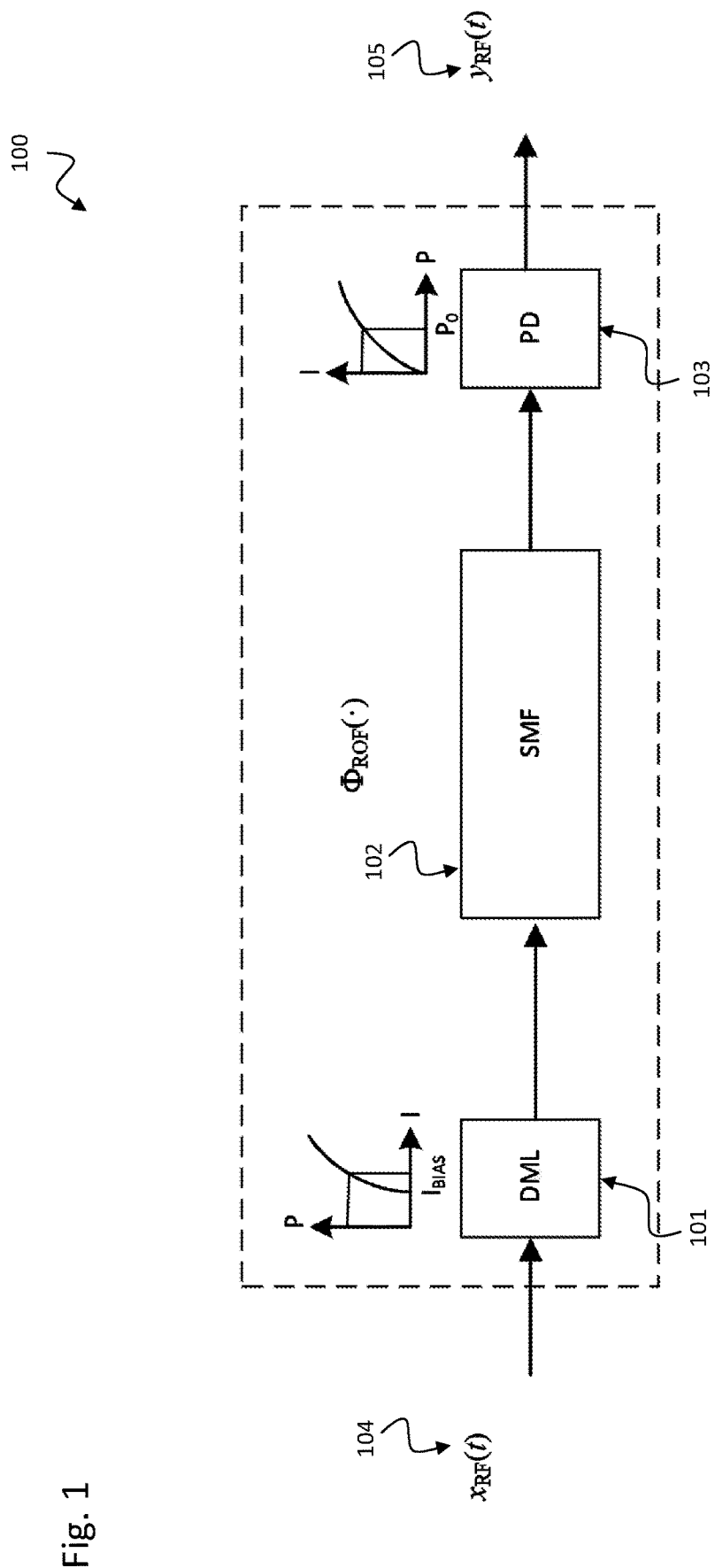
FIG. 1 shows a block diagram illustrating distortion in a radio over fiber (ROF) channel system.
Figure 2:
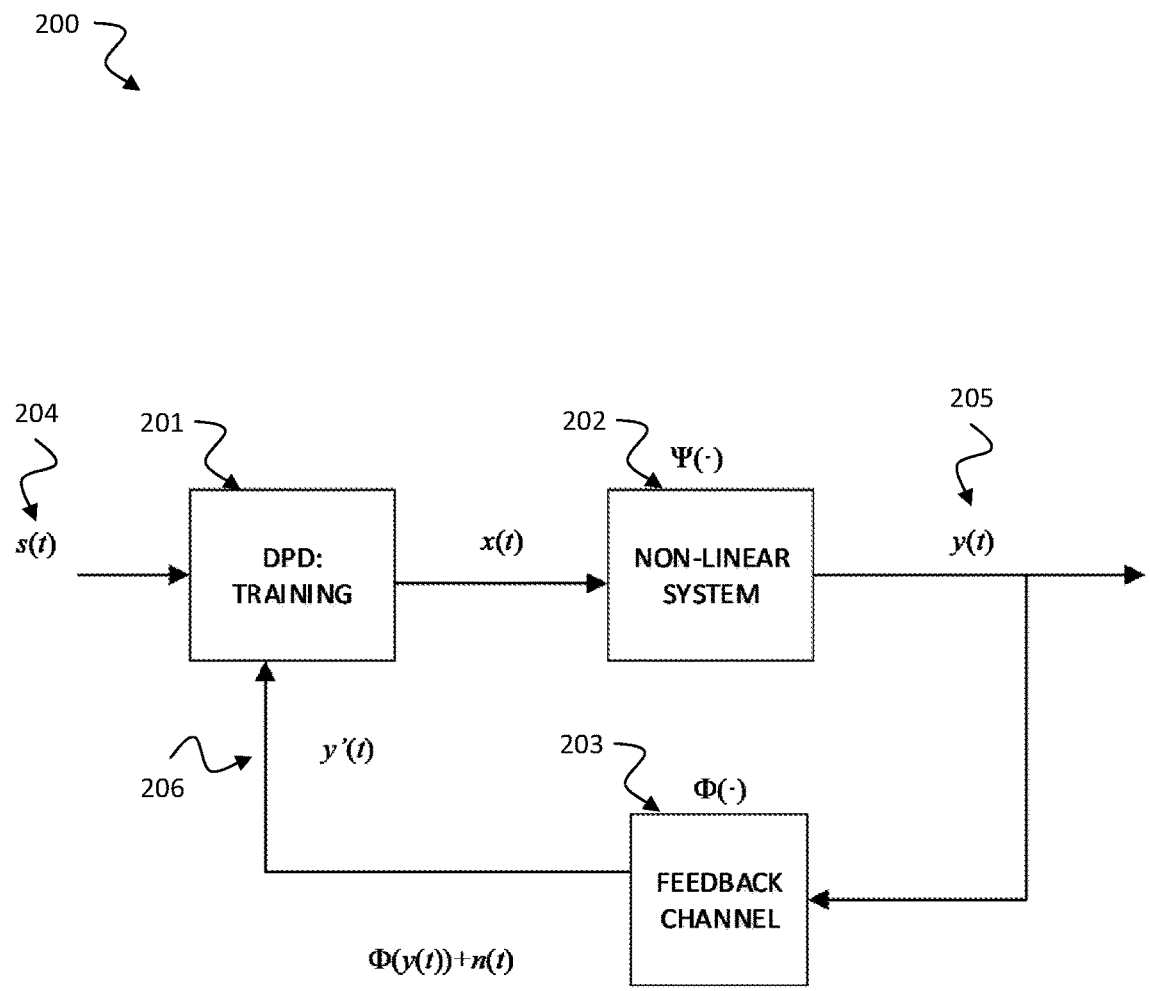
FIG. 2 shows a block diagram of a digital predistortion (DPD) system including DPD algorithm degradation due to feedback channel distortion.

In the following detailed description, reference is made to the accompanying drawings, which form a part thereof, and in which is shown byway of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

It is understood that comments made in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

The methods, devices and systems described herein may particularly be implemented in radio over fiber (ROF) communications using remote radio units and central units.

Radio over fiber (RoF) refers to a technology whereby light is modulated by a radio frequency signal and transmitted over an optical fiber link. Main technical advantages of using fiber optical links are lower transmission losses and reduced sensitivity to noise and electromagnetic interference compared to all-electrical signal transmission. Applications range from the transmission of mobile radio signals (e.g. 3G, 4G, 5G and WiFi), the transmission of cable television signal and satellite communications.

In the area of Wireless Communications one main application is to facilitate wireless access, such as 5G and WiFi simultaneous from the same antenna. In other words, radio signals are carried over fiber-optic cable. Thus, a single antenna can receive any and all radio signals (5G, Wifi, cell, etc.) carried over a single-fiber cable to a central location where equipment then converts the signals.

A remote radio unit (RRU), also called a remote radio head (RRH) in wireless networks, is a remote radio transceiver that connects to an operator radio control panel via electrical or wireless interface.

In wireless system technologies such as GSM, CDMA, UMTS, LTE, 5G the radio equipment is remote to the BTS/NodeB/eNodeB/gNodeB (also referred to as the central unit). The equipment is used to extend the coverage of a BTS/NodeB/eNodeB/gNodeB in challenging environments such as rural areas or tunnels. They are generally connected to the BTS/NodeB/eNodeB/gNodeB via a fiber optic cable using Common Public Radio Interface protocols.

RRUs have become one of the most important subsystems of today's new distributed base stations. The RRU contains the base station's RF circuitry plus analog-to-digital/digital-to-analog converters and up/down converters. RRUs also have operation and management processing capabilities and a standardized optical interface to connect to the rest of the base station. Remote radio units make MIMO operation easier; they increase a base station's efficiency and facilitate easier physical location for gap coverage problems.

The methods, devices and systems described herein may particularly utilize PRBS and BPSK generators.

A pseudorandom binary sequence (PRBS) is a binary sequence that, while generated with a deterministic algorithm, is difficult to predict and exhibits statistical behavior similar to a truly random sequence. Pseudorandom binary sequences can be generated using linear feedback shift registers.

BPSK (binary phase shift keying) is the simplest form of phase shift keying (PSK). It uses two phases which are separated by 180° and so can also be termed 2-PSK. It does not particularly matter exactly where the constellation points are positioned. Therefore, it handles the highest noise level or distortion before the demodulator reaches an incorrect decision. That makes it the most robust of all the PSKs.

The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The devices and systems described herein may include processors or processing devices, memories and transceivers, i.e. transmitters and/or receivers. In the following description, the term "processor" or "processing device" describes any device that can be utilized for processing specific tasks (or blocks or steps). A processor or processing device can be a single processor or a multi-core processor or can include a set of processors or can include means for processing. A processor or processing device can process software or firmware or applications etc.

Figure 4:
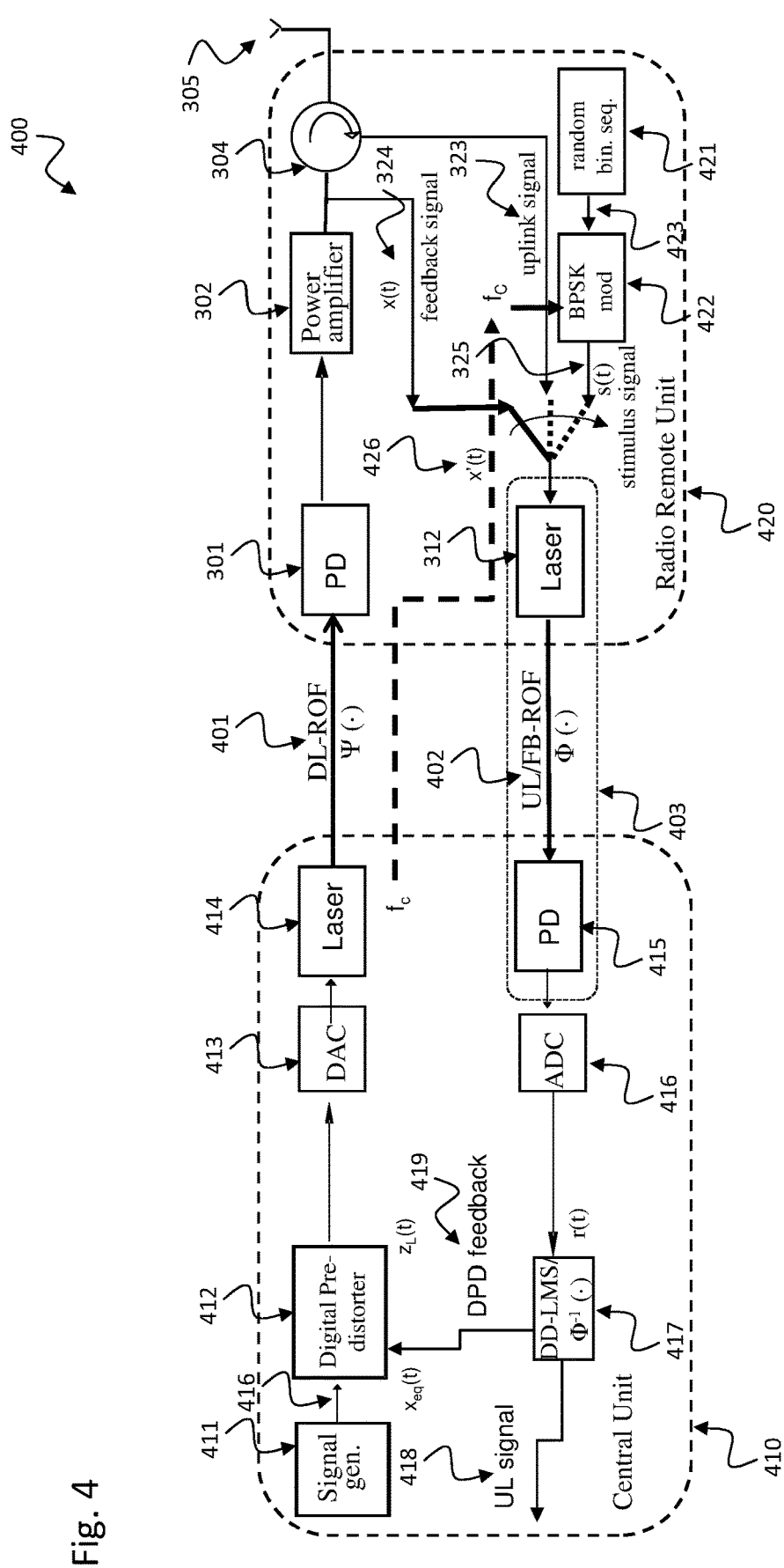
FIG. 4 shows a block diagram of a MIMO system with a Central Unit (CU) and a Radio Remote Unit (RRU) applying BPSK-aided post-distortion according to the disclosure.

FIG. 4 shows a block diagram of a MIMO system 400 with Central Unit (CU) 410 and Radio Remote Unit (RRU) 420 applying BPSK-aided post-distortion according to the disclosure.

Such a multiple-input multiple-output (MIMO) system 400 comprises a central unit 410 and a remote radio unit (RRU) 420 that is coupled to the CU by a single mode fiber (SMF).

Figure 3:
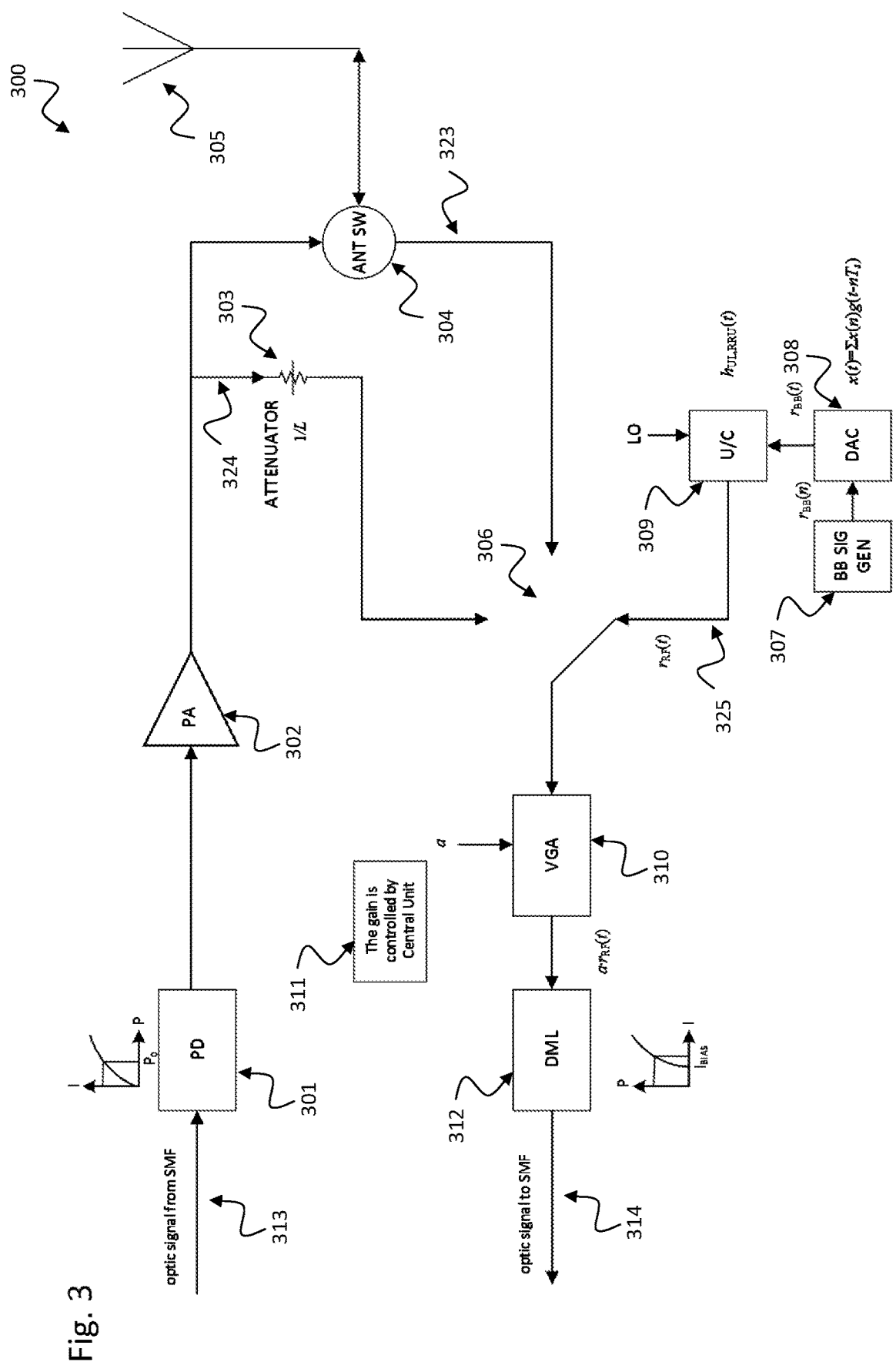
FIG. 3 shows a block diagram of a remote radio unit (RRU) applying training sequence based post-distortion.

The RRU 420 comprises a binary phase shift keying (BPSK) modulator 422 that is configured to modulate a BPSK waveform 423 by a local oscillator (LO) signal 426 to generate a stimulus signal 325. The LO signal 426 is derived from a downlink optical signal 313 (e.g. as shown in FIG. 3) received via downlink radio over fiber (DL-ROF) 401, from the central unit (CU) 410. The RRU 420 further comprises an optical signal generator 312, e.g. a laser (or a photo-diode) that is configured to generate an uplink optical signal 314 (e.g. as shown in FIG. 3) based on the stimulus signal 325 for transmission via uplink radio over fiber, UL-ROF 402, to the CU 410.

A power of the uplink optical signal 314 may be controlled by the CU 410 via a control channel (represented as the dashed line between CU 410 and RRU 420 in FIG. 4).

Figure 5:
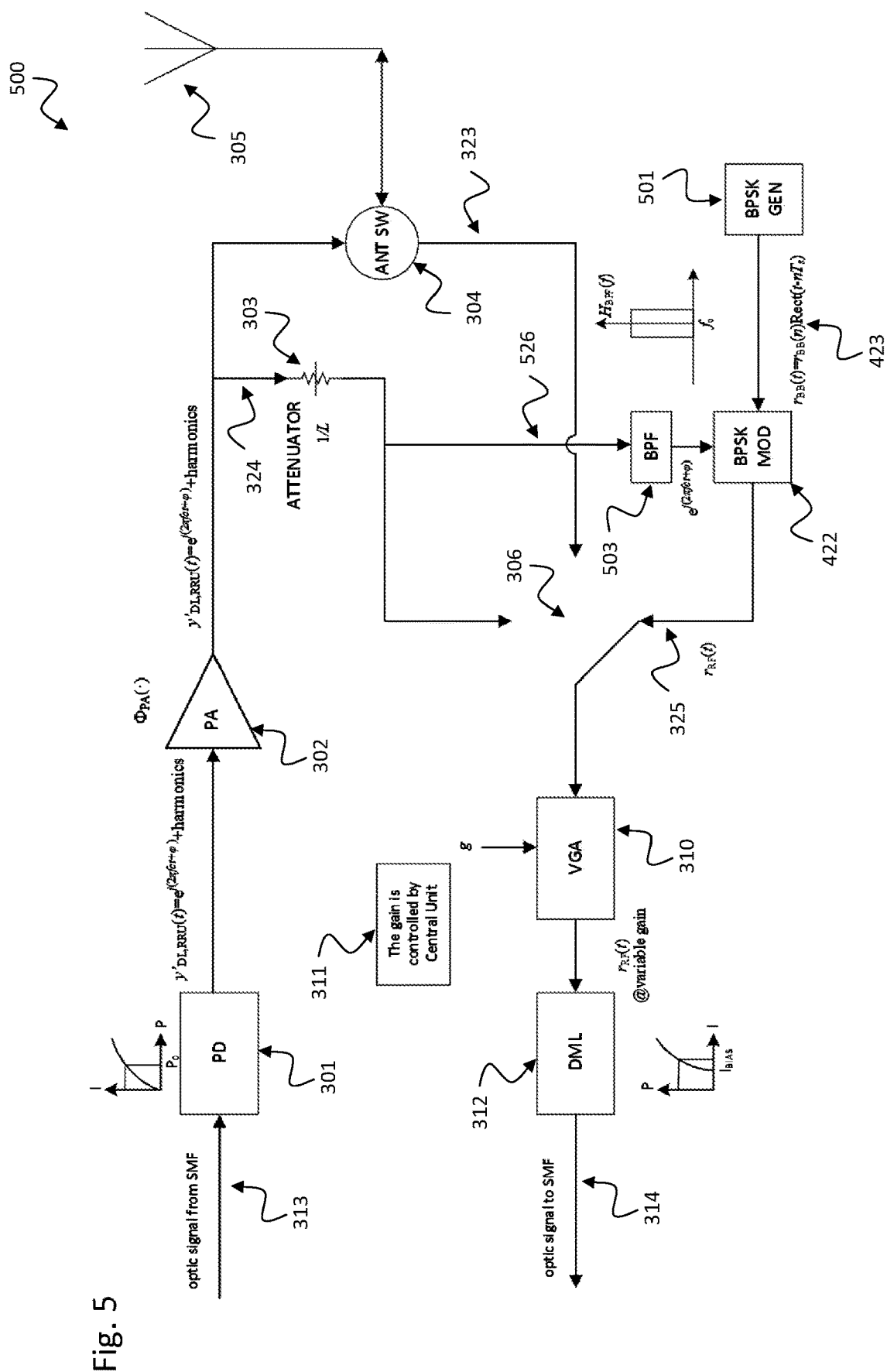
FIG. 5 shows a block diagram of a remote radio unit (RRU) configured to apply BPSK-aided blind equalization according to the disclosure.

The RRU 420 may comprise a band pass filter (BPF) (e.g. a BPF 503 as shown in FIG. 5) that is configured to retrieve the LO signal 426 from the downlink optical signal 313. The downlink optical signal 313 may carry the LO signal 426 of carrier frequency fc and harmonics of the carrier frequency fc. A pass band frequency range of the BPF 503 may include the carrier frequency fc.

The RRU 420 may further include a pseudo-random binary sequence (PRBS) generator 421 or a white noise generator that is configured to generate the BPSK waveform 423.

Figure 10:
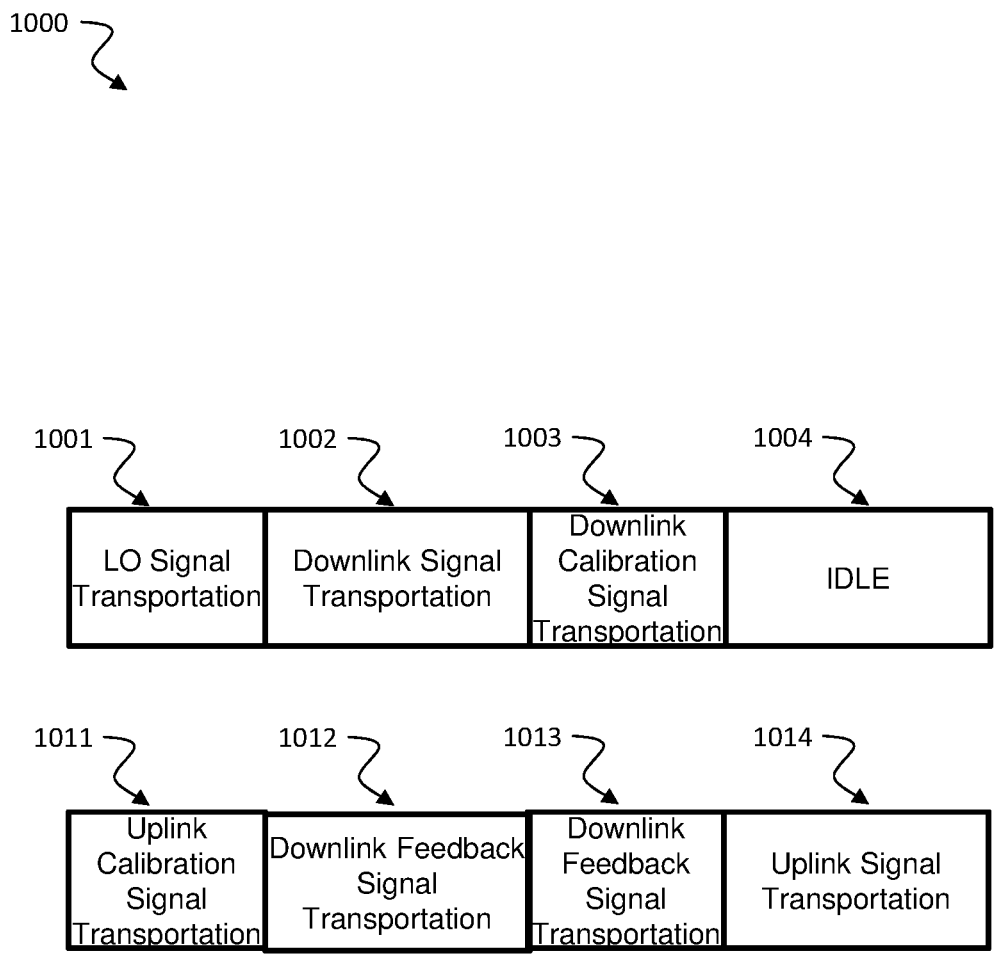
FIG. 10 shows a schematic diagram of a TDD system illustrating TDD operation and ROF channel calibration according to the disclosure.

The RRU 420 may be operated in time division duplex (TDD) mode, e.g. as illustrated in FIG. 10. In particular, a downlink (DL) phase of the TDD mode may be used for reception of the DL optical signal 313 via DL-ROF 401, an uplink, UL, phase of the TDD mode may be used for transmission of the UL optical signal 314 via UL-ROF 402, and a DL/UL or UL/DL switch interval may be used for training and/or calibration, e.g. as described below with respect to FIG. 10.

Figure 6:
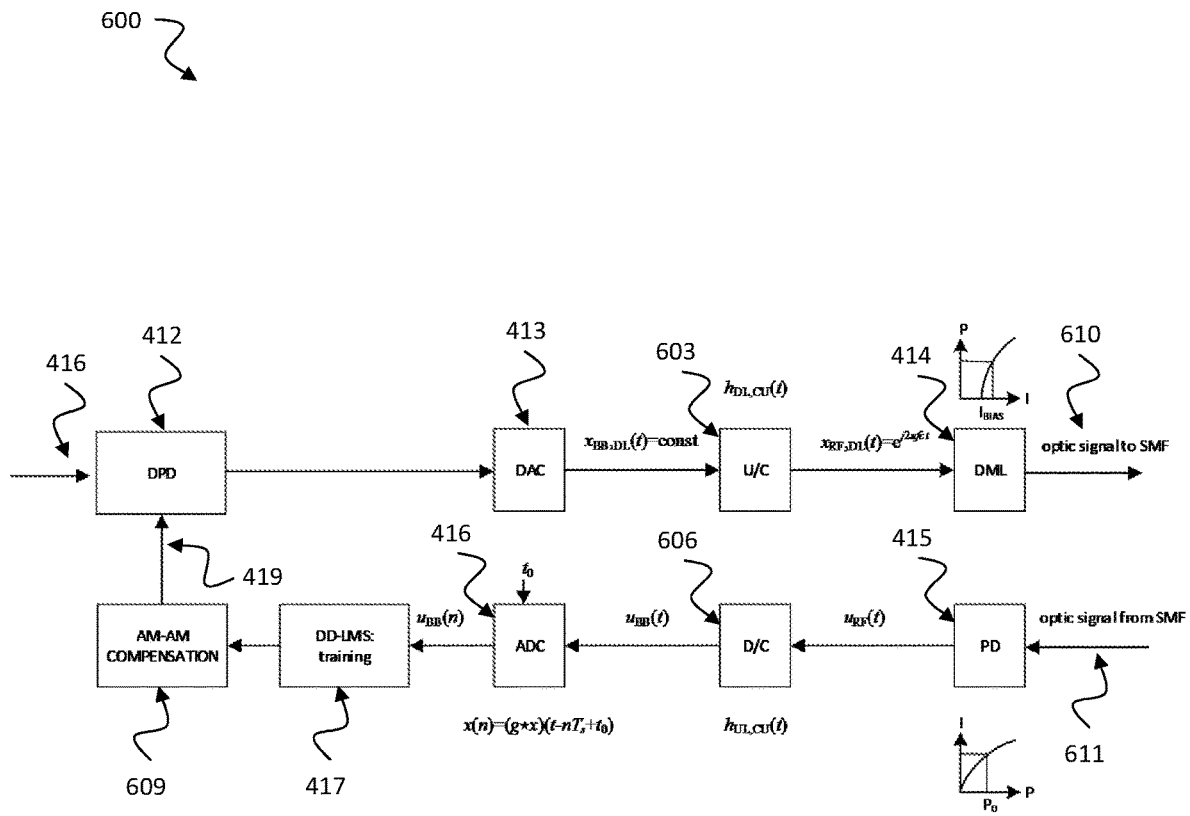
FIG. 6 shows a block diagram of a central unit (CU) configured to apply BPSK-aided blind equalization according to the disclosure.

The CU 410 comprises an optical signal generator 414, e.g. a laser (or a photo-diode) that is configured to generate a downlink optical signal, e.g. a signal 61o as shown in FIG. 6, based on a downlink digital signal 416 for transmission via downlink radio over fiber (DL-ROF) 401, to the RRU 420. The CU 410 further includes a digital pre-distorter (DPD) 412, that is configured to digitally pre-distort the downlink digital signal 416 based on a DPD feedback signal 419. The CU 410 further includes a blind linear digital channel equalizer 417 that is configured to provide the DPD feedback signal 419 based on an uplink optical signal, e.g. signal 611 shown in FIG. 6, received via uplink radio over fiber (UL-ROF) 402, from the RRU 420.

The CU 410 may be configured to apply a decision-directed least-mean-squares (DD-LMS) algorithm on an uplink digital signal derived from the uplink optical signal 611 to determine equalization coefficients of the blind linear digital channel equalizer 417.

The CU 410 may be configured to vary a gain of the uplink optical signal 611 generated at the RRU 420 via a control channel with the RRU 420 to identify a non-linear distortion introduced by the UL-ROF 402. The CU 410 may be configured to identify an amplitude-to-amplitude modulation (AM-AM) response (e.g. determined by AM-AM compensator 609 shown in FIG. 6) of the UL-ROF 402 based on the gain variation of the uplink optical signal 611.

The CU 410 may be configured to identify the non-linear distortion introduced by the UL-ROF 402 based on an approximation as a memory-less non-linear system, in particular by an N-L or Hammerstein model. The Hammerstein model is a special model form for non-linear dynamic systems named after Adolf Hammerstein. Characteristic is the structure consisting of the series connection of a static non-linearity in front of a linear time-invariant dynamic system. The Hammerstein model is defined for both single and multi-size systems.

The CU 410 may be configured to adjust the blind linear digital channel equalizer 417 based on the relation:

$$u_{BB} = h_{UL,CU} * \Phi_{UL,ROF}(gr_{BB}) + n_{BB},$$

where $u_{BB}$ denotes digital baseband representation of the uplink optical signal 611, $h_{UL,CU}$ denotes linear distortion introduced at the CU 410, $\Phi_{UL,ROF}$ denotes non-linear distortion introduced by the UL-ROF 402, g denotes gain of the uplink optical signal 611 generated at the RRU 420, $r_{BB}$ denotes digital baseband representation of a BPSK waveform at the RRU 420 used to generate the uplink optical signal 611 and $n_{BB}$ denotes a distortion signal.

The CU 410 may be operated in time division duplex (TDD) mode, e.g. as illustrated in FIG. 10. In particular, a downlink (DL) phase of the TDD mode may be used for transmission of the DL optical signal via DL-ROF, an uplink (UL) phase of the TDD mode may be used for reception of the UL optical signal via UL-ROF, and a DL/UL or UL/DL switch interval may be used for training and/or calibration, e.g. as described below with respect to FIG. 10.

The CU 410 may be configured to send a local oscillator (LO) signal of carrier frequency fc via the DL-ROF 401 to the RRU 420.

The MIMO system 400 shown in FIG. 4 can be implemented with a very compact radio remote unit (RRU) design by employing a simple stimulus signal generation with assumption that there is no knowledge of the stimulus sequence at the receiver side. In such scenario, blind equalization is performed and the following system design, namely BPSK-aided post-distortion, is applied with a carrier signal (LO) modulated by a binary sequence randomly generated at RRU side. The power of RF signal as input to uplink ROF (DML) is controlled by CU.

The MIMO system 400 design can be characterized by the following features:

(1) the CU 410 sends the LO signal with carrier frequency $f_c$ via the DL-ROF 401;

(2) RRU 420 side receives this LO signal, then performs Band Pass Filter (BPF) to retrieve the LO signal before feeding it to Binary Phase Shift Keying (BPSK) modulator 422; on the other hand, a BPSK waveform 423 generated by random binary sequence generator (PRBS, pseudo-random binary sequence) 421 or white noise generator is sent to BPSK-modulator 422; the modulated BPSK RF signal is sent to the UL-ROF 402 (feedback channel) with gain g controlled by central unit (CU) 410;

(3) at CU 410 side, blind linear channel equalization 417 is applied, for example decision-driven least mean squares (DD-LMS) algorithm, on the received baseband signal to identify the uplink linear distortion; by varying the gain g at RRU 420 side, find the amplitude-to-amplitude modulation (AM-AM) function corresponding to the UL-ROF memoryless nonlinear distortion;

(4) at CU 410 side linear distortion compensation and nonlinear distortion compensation is applied on the DPD feedback signal or uplink signal.

FIG. 5 shows a block diagram of a remote radio unit (RRU) 500 configured to apply BPSK-aided blind equalization according to the disclosure. The RRU 500 represents an implementation of the RRU 420 described above with respect to FIG. 4.

The optic signal 313 received from SMF, i.e. via DL-ROF 401 as described above with respect to FIG. 4 passes post-distortion module (PD) 301 and power amplifier (PA) 302. After PD 301 (and also after PA), the received signal can be represented by a carrier frequency component and a plurality of harmonics. The receive signal after PA 302 branches to a first branch with attenuator 303 that provides feedback signal x(t) 526 that is forwarded via first sub-branch to modulator switch 306 and via second sub-branch to bandpass filter (BPF) 503 and to BPSK modulator 422. The receive signal after PA 302 branches to a second branch with antenna switch 304 where it is switched to antenna 305 and as uplink signal 323 to modulator switch 306. BPSK modulator 422 is fed by a modulation waveform 423 that is generated by a BPSK generator 501. The BPF 503 is configured to filter out the carrier frequency component from the plurality of harmonics of the received optical signal 313. This carrier frequency component controls the BPSK modulator 422. After modulator switch 306 the generated output signal is passed to a variable gain amplifier (VGA) 310 controlling a gain g of the output signal. Via a control channel (not depicted in FIG. 5) the gain can be controlled 311 by the CU 410. The amplified output signal is used to excite the optical generator 312, i.e. directly modulated laser 312 that generates the optic signal 314 fed to SMF 403 for transmission via UL/FB-ROF 402 as shown in FIG. 4.

In the RRU 500 depicted in FIG. 5, a LO signal is sent by CU 410 via DL-ROF 401, denoted by $x_{RF,DL}(t)$ in FIG. 6 that describes a CU implementation 600.

The received signal $y_{DL,RRU}(t)$ 313 (output of DL-ROF 401) or $y'_{DL, RRU}(t)$ (PA output) is actually the LO signal and its harmonics, considering the non-linear effect of DL-ROF 401 and PA 302. This RF signal is then fed to BPSK modulator 422, after the filtering the harmonics by using BPF 503 for $f_e$ (Band Pass Filter), the CU's LO can be perfectly recovered. Since the LO and its harmonics are far spaced in frequency domain, for example 3.5 GHz, the BPF 503 is easy to design. The benefit of using CU forwarded LO signal is this can effectively remove the carrier-frequency offset (CFO). The linear or non-linear distortion is all mitigated as well.

At RRU side 500, the BPSK sequence or baseband waveform generator 501 is installed and the generated sequence 423 is not necessarily known to CU 410. This BPSK signal generator 501 can be either a pseudo-random binary sequence (PRBS) generator or filtered white noise generator. The interesting part is the simplified RRU design 500 since the random binary sequence generator 501, the BPSK modulator 422 and the filter can be implemented as cheap and compact units (hardware circuits), e.g. by using standard integrated circuits.

The modulated RF signal, denoted by $r_{RF}(t)$ is amplified by a gain g, controlled by CU 410 via low-rate digital control.

FIG. 6 shows a block diagram of a central unit (CU) 600 configured to apply BPSK-aided blind equalization according to the disclosure. The CU 600 represents an implementation of the CU 410 described above with respect to FIG. 4. It can be combined with the RRU design 500 described above with respect to FIG. 5 to a MIMO system as shown in FIG. 4.

In the CU design 600 a digital input signal 416 is passed to digital pre-distortion (DPD) unit 412. The output of DPD 412 passes digital-to-analogue converter (DAC) 413 and upconverter 603 before it excites a directly modulated laser (DML) 414 (i.e. optical signal generator) to generate optic signal 610 to SMF. In the receive path, optic signal 611 is received from SMF 403 (see FIG. 4) and passes post-distortion (PD) unit 414, down-converter (D/C) 606, analogue-to-digital converter (ADC) 416 where it is converted to a digital receive signal $u_{BB}(n)$. This digital receive signal $u_{BB}(n)$ is input to blind channel compensator 417 using for example DD-LMS training algorithm. After AM-AM compensation block 609 compensated digital signal 419 is used to control DPD 412.

At CU side 600, blind channel equalization such like decision-directed least-mean-square (DD-LMS) algorithm is executed to find the linear equalizer's coefficients. Then, the gain applied on $r_{RF}(t)$ 325 (see FIG. 5) is varied to identify the nonlinear distortion. This processing can be detailed as follows:

The feedback system can be modelled as:

$$u_{BB}=h_{UL,CU}*\Phi_{UL,ROF}(g*r_{BB})+n_{BB} \qquad (2)$$

where $h_{UL,CU}(t)$ denotes the linear distortion introduced at CU 410, 600 (LNA, mixer, LPF, ADC, etc.) and <UL,ROF (•) denotes the nonlinear distortion introduced by UL-ROF 402. Note that the linear distortion at RRU side 420 can be omitted since typically BPSK modulator 422 exhibits less linear distortion (on RF signal) compared with conventional up-conversion approach. Based on the fact that $\Phi_{UL,ROF}$ (•) can be approximated as a memory-less non-linear system, see "E. E. Bergamann, "Dispersion-Induced Composite Second-Order Distortion at 1.5 um," IEEE PHOTONICS TECHNOLOGY LETTER VOL 3 NO 1, 1991", the $\Phi_{UL,ROF}$ (•) can be described by using an AM-AM model 700 as shown in FIG. 7 (equivalent to the absolute value of the complex baseband signal) such that the feedback ROF channel can be approximated by an N-L or Hammerstein model.

Figure 7:
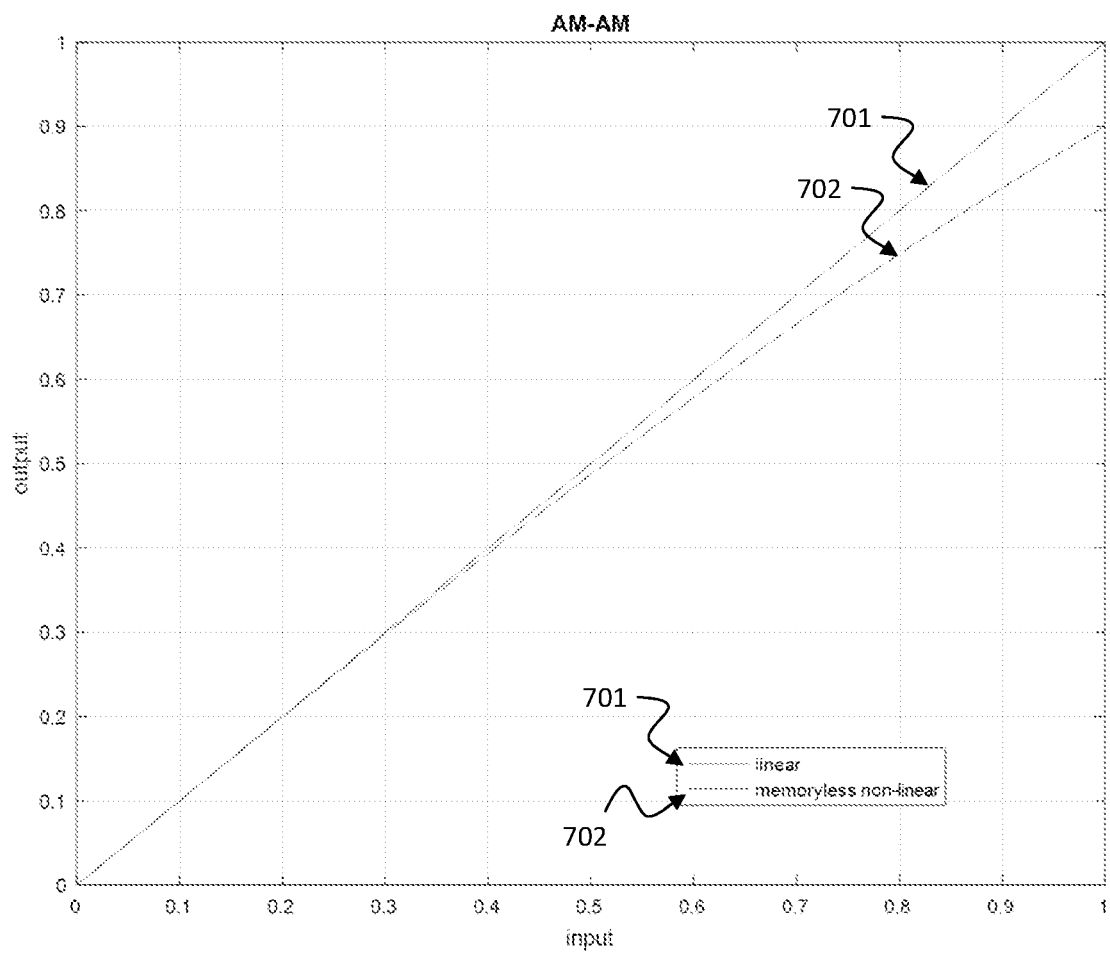
FIG. 7 shows a performance diagram illustrating the memoryless non-linear effect for AM-AM.

FIG. 7 shows a performance diagram 700 illustrating the memoryless non-linear effect for AM-AM. Graph 702 represents the non-linear system that can be approximated as linear system (depicted by graph 701). A good approximation can be obtained for input values between 0 and 0.5 while a still acceptable approximation can be obtained for input values between 0.5 and 1. Thus the non-linear system can be approximated as memoryless.

Figure 8:
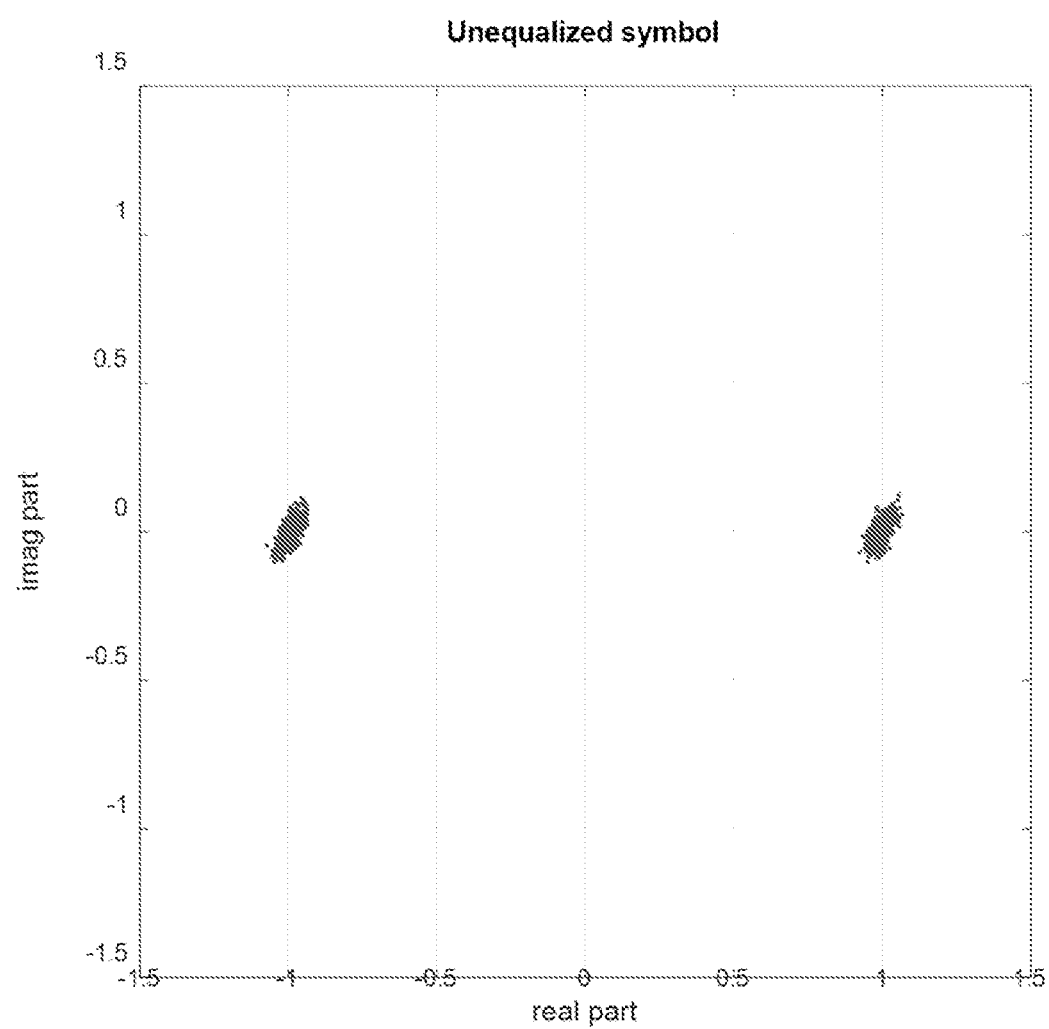
FIG. 8 shows a symbol diagram in the complex plane for unequalized ROF transmission.
Figure 9:
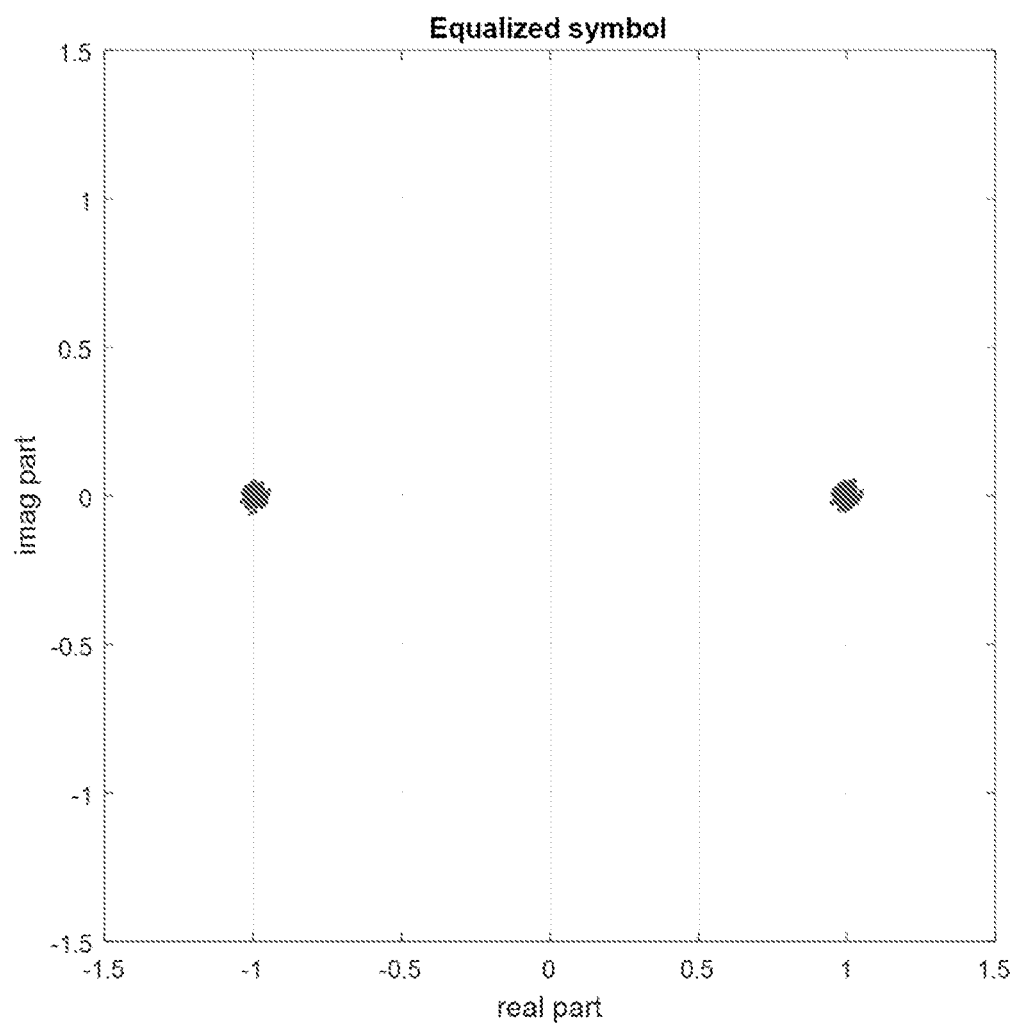
FIG. 9 shows a symbol diagram in the complex plane for equalized ROF transmission using BPSK-aided equalization according to the disclosure.

FIG. 8 shows a symbol diagram 800 in the complex plane for unequalized ROF transmission and FIG. 9 shows a symbol diagram 900 in the complex plane for equalized ROF transmission using BPSK-aided equalization according to the disclosure.

When using BPSK waveform with constant power (amplitude), the ROF non-linear distortion $\Phi_{UL,ROF}$ will not impact the compensation on linear distortion as $h_{UL,CU}$ is compensated: a BPSK waveform after memoryless non-linear distortion is still a BPSK waveform. Thus, the conventional blind equalization technique DD-LMS can be used to compensate $h_{UL,CU}$ and then identify the AM-AM response of $\Phi_{UL,ROF}$ by varying the VGA gain g at RRU via control channel. The calibration is the inverse of $\Phi_{UL,ROF}$.

The symbol diagrams 800 and 900 show that the feedback signal quality can be effectively improved. FIGS. 8 and 9 are examples for a 20 km ROF transmission where the EVM is improved from 4.78% to 2.41%.

FIG. 10 shows a schematic diagram of a TDD system 1000 illustrating TDD operation and ROF channel calibration according to the disclosure.

The calibration of UL/DL-ROF has been designed for a time division duplex (TDD) system 1000 as shown in FIG.

10. The time intervals 1002, 1012 are used for downlink signal transportation and downlink feedback signal transportation while time intervals 1004 and 1014 are used as IDLE state and for uplink signal transportation, i.e. according to a usual TDM system:

(1) during downlink phase 1002, 1012 use DL-ROF for downlink signal transportation;

(2) during uplink phase 1004, 1014, use UL-ROF for uplink signal transportation;

(3) for downlink calibration (including DL-ROF and PA at RRU side), use UL-ROF as feedback channel.

In the new system design according to the disclosure, the DL/UL 1003, 1013 or UL/DL 1001, 1011 switch interval can be used for dedicated calibration:

(1) during the UL/DL switch interval 1001, 1011, the DL-ROF and UL-ROF are both free such that the LO signal in the disclosed BPSK-aided equalization method can be send by DL-ROF from CU 410 to RRU 420, then the disclosed blind equalization can be executed;

(2) during the DL/UL switch interval 1003, 1013, the same downlink calibration can be performed as in the downlink phase.

Since the calibration procedure can be executed in an adaptive filter manner, the post-distortion can track the quick variation of the environment so compared with conventional off-line training method, this approach is more suitable for on-line calibration.

Figure 11:
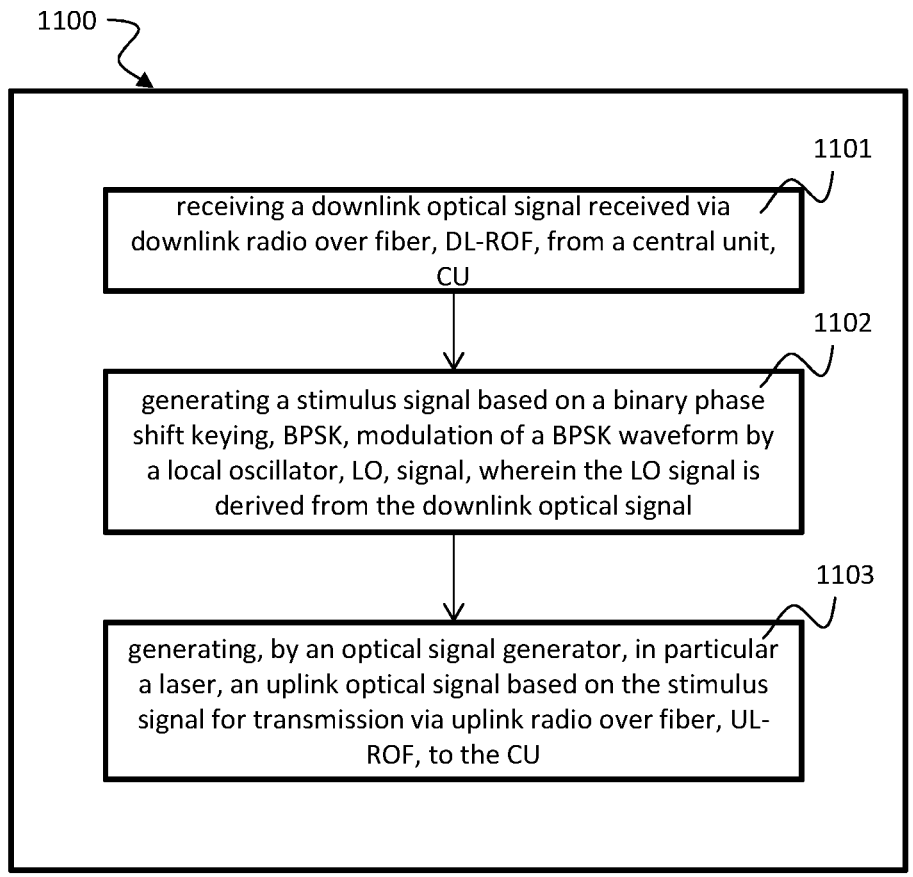
FIG. 11 shows a schematic diagram illustrating a method for generating an uplink optical signal by a remote radio unit (RRU) according to the disclosure.

FIG. 11 shows a schematic diagram illustrating a method for generating an uplink optical signal by a remote radio unit (RRU) according to the disclosure, for example by a RRU as described above with respect to FIGS. 4 and 5.

The method 1100 comprises receiving 1101 a downlink optical signal received via downlink radio over fiber, DL-ROF, from a central unit, CU, e.g. a CU as described above with respect to FIGS. 4 and 6.

The method 1100 comprises generating 1102 a stimulus signal based on a binary phase shift keying, BPSK, modulation of a BPSK waveform by a local oscillator, LO, signal, wherein the LO signal is derived from the downlink optical signal, e.g. as described above with respect to FIGS. 4 and 5.

The method 1100 comprises generating 1103, by an optical signal generator, in particular a laser, an uplink optical signal based on the stimulus signal for transmission via uplink radio over fiber, UL-ROF, to the CU, e.g. as described above with respect to FIGS. 4 and 5.

Figure 12:
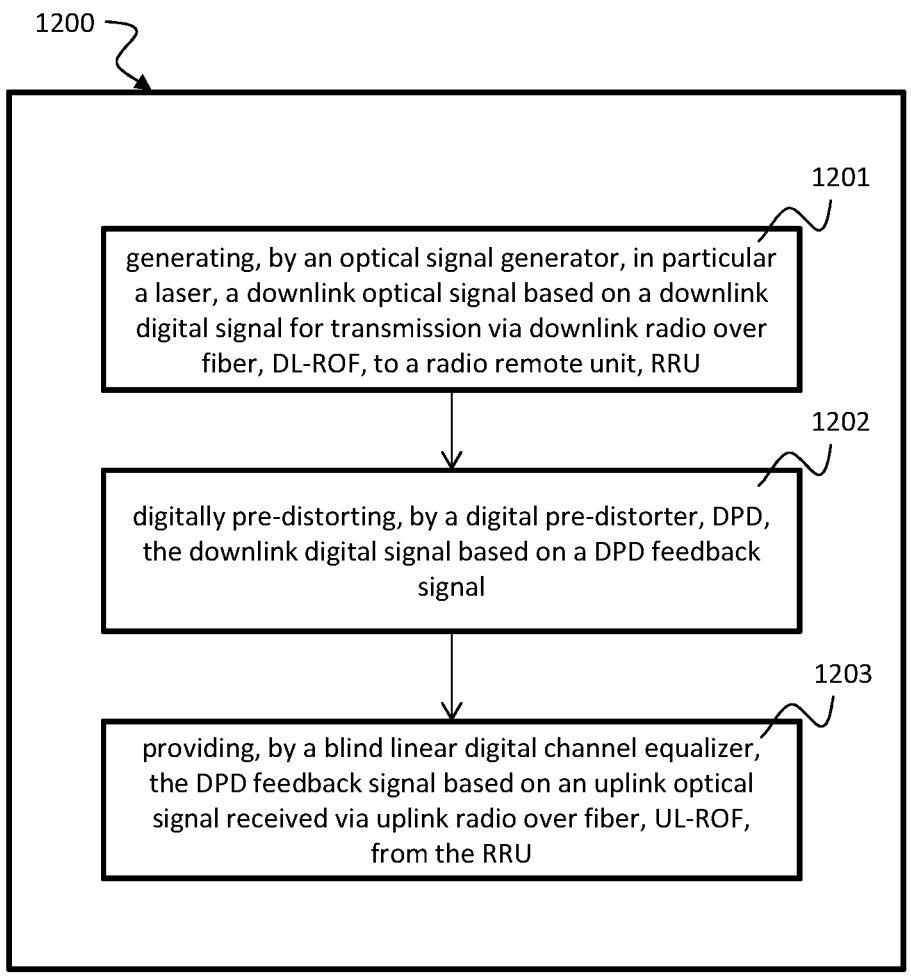
FIG. 12 shows a schematic diagram illustrating a method for generating a downlink optical signal by a central unit (CU) according to the disclosure.

FIG. 12 shows a schematic diagram illustrating a method for generating a downlink optical signal by a central unit (CU) according to the disclosure, for example by a CU as described above with respect to FIGS. 4 and 6.

The method 1200 comprises generating 1201, by an optical signal generator, in particular a laser, a downlink optical signal based on a downlink digital signal for transmission via downlink radio over fiber, DL-ROF, to a radio remote unit, RRU, e.g. a RRU as described above with respect to FIGS. 4 and 5.

The method 1200 comprises digitally pre-distorting 1202, by a digital pre-distorter, DPD, the downlink digital signal based on a DPD feedback signal, e.g. as described above with respect to FIGS. 4 and 6.

The method 1200 comprises providing 1203, by a blind linear digital channel equalizer, the DPD feedback signal based on an uplink optical signal received via uplink radio over fiber, UL-ROF, from the RRU, e.g. as described above with respect to FIGS. 4 and 6.

The present disclosure also supports a computer program product including computer executable code or computer executable instructions that, when executed, causes at least one computer to execute the performing and computing steps described herein, in particular the methods and procedures described above. Such a computer program product may include a readable non-transitory storage medium storing program code thereon for use by a computer. The program code may perform the processing and computing steps described herein, in particular the methods and procedures described above.

While a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

What is claimed is:

1. A remote radio unit (RRU), comprising:
   a binary phase shift keying (BPSK) modulator, configured to modulate a BPSK waveform using a local oscillator (LO) signal, to generate a stimulus signal, wherein the LO signal is derived from a downlink optical signal received via downlink radio over fiber (DL-ROF) from a central unit (CU);
   an optical signal generator, configured to generate an uplink optical signal based on the stimulus signal for transmission via uplink radio over fiber (UL-ROF) to the CU; and
   a band pass filter (BPF), configured to derive the LO signal from the downlink optical signal.

2. The RRU of claim 1, wherein a power of the uplink optical signal is controlled by the CU via a control channel.

3. The RRU of claim 1, wherein the downlink optical signal carries the LO signal on a carrier frequency fc and harmonics of the carrier frequency fc.

4. The RRU of claim 3, wherein a pass band frequency range of the BPF includes the carrier frequency fc.

5. The RRU of claim 1, further comprising:
a pseudo-random binary sequence (PRBS) generator, configured to generate the BPSK waveform; or
a white noise generator, configured to generate the BPSK waveform.

6. The RRU of claim 1, wherein:
the RRU operates in time division duplex (TDD) mode;
a downlink (DL) phase of the TDD mode is used for reception of the DL optical signal via DL-ROF;
an uplink (UL) phase of the TDD mode is used for transmission of the UL optical signal via UL-ROF; and
a DL/UL or UL/DL switch interval is used for training or calibration.

7. The RRU of claim 1, wherein the optical signal generator is a laser.

8. A method, comprising:
receiving, by a remote radio unit (RRU), a downlink optical signal via downlink radio over fiber (DL-ROF) from a central unit (CU);
deriving, by a band pass filter (BPF) disposed in the RRU, a local oscillator (LO) signal from the downlink optical signal;
generating, by the RRU, a stimulus signal based on a binary phase shift keying (BPSK) modulation of a BPSK waveform using the local oscillator (LO) signal, wherein the LO signal is derived from the downlink optical signal; and
generating, by an optical signal generator, an uplink optical signal based on the stimulus signal for transmission via uplink radio over fiber (UL-ROF) to the CU.

9. The method of claim 8, wherein a power of the uplink optical signal is controlled by the CU via a control channel.

10. The method of claim 8, wherein the downlink optical signal carries the LO signal on a carrier frequency fc and harmonics of the carrier frequency fc.

11. The method of claim 10, wherein a pass band frequency range of the BPF includes the carrier frequency fc.

12. The method of claim 8, further comprising:
generating, by a pseudo-random binary sequence (PRBS) generator, the BPSK waveform; or
generating, by a white noise generator, the BPSK waveform.

13. The method of claim 8, wherein:
the RRU operates in time division duplex (TDD) mode;
a downlink (DL) phase of the TDD mode is used for reception of the DL optical signal via DL-ROF;
an uplink (UL) phase of the TDD mode is used for transmission of the UL optical signal via UL-ROF; and
a DL/UL or UL/DL switch interval is used for training or calibration.

14. The method of claim 8, wherein the optical signal generator is a laser.

15. A device, comprising:
a processor; and
a non-transitory computer-readable storage medium storing a program to be executed by the processor, the program including instructions for:
receiving, by a remote radio unit (RRU), a downlink optical signal via downlink radio over fiber (DL-ROF) from a central unit (CU);
acquire a local oscillator signal from the downlink optical signal derived by a band pass filter (BPF);
generating, by the RRU, a stimulus signal based on a binary phase shift keying (BPSK) modulation of a BPSK waveform using the local oscillator (LO) signal, wherein the LO signal is derived from the downlink optical signal; and
generating, by an optical signal generator, an uplink optical signal based on the stimulus signal for transmission via uplink radio over fiber (UL-ROF) to the CU.

16. The device of claim 15, wherein a power of the uplink optical signal is controlled by the CU via a control channel.

17. The device of claim 15, wherein the downlink optical signal carries the LO signal on a carrier frequency fc and harmonics of the carrier frequency fc.

18. The device of claim 17, wherein a pass band frequency range of the BPF includes the carrier frequency fc.

19. The device of claim 15, further comprising:
generating, by a pseudo-random binary sequence (PRBS) generator, the BPSK waveform; or
generating, by a white noise generator, the BPSK waveform.

20. The device of claim 15, wherein:
the RRU operates in time division duplex (TDD) mode;
a downlink (DL) phase of the TDD mode is used for reception of the DL optical signal via DL-ROF;
an uplink (UL) phase of the TDD mode is used for transmission of the UL optical signal via UL-ROF; and
a DL/UL or UL/DL switch interval is used for training or calibration.

* * * * *